INVENTOR
NEAL T. SAUNDERS

INVENTOR
NEAL T. SAUNDERS

ATTORNEYS

United States Patent Office 3,141,769
Patented July 21, 1964

3,141,769
METHOD OF PRODUCING POROUS TUNGSTEN IONIZERS FOR ION ROCKET ENGINES
Neal T. Saunders, Olmsted Falls, Ohio, assignor to the United States of America as represented by the Administrator of the National Aeronautics and Space Administration
Filed June 18, 1962, Ser. No. 203,409
5 Claims. (Cl. 75—222)
(Granted under Title 35, U.S. Code (1952), sec. 266)

The invention described herein may be manufactured and used by or for the Government of the United States of America for governmental purposes without the payment of any royalties thereon or therefor.

This invention relates to an ionizer plate for an ion engine, and more particularly, the invention relates to a thin, permeable tungsten body that will allow the flow of cesium vapors therethrough during the operation of the said engine at temperatures of about 2000° F–2500° F. for long periods of time which at the same time effectively ionizes the said cesium vapor.

Engines of the ion rocket type develop thrust by the acceleration of the ions through a large voltage gradient. But one of the main problem areas concerns the method of producing the propellant ions. Several methods of utilizing surface ionization of neutral atoms are being considered. One of the most promising method lies in the use of a porous plate which will allow a small flow of gaseous metal atoms particularly the alkali metal atoms to come in contact with an ionizing surface.

Because of their low ionization potential that is, the energy required to remove an electron from a neutral atom of the alkali metals, atoms of these metals are particularly useful as a fuel for producing the propellant ions of the said engines. Of the alkali metals, cesium has been the most seriously considered because of its relatively high mass. The greater the mass of the particular ion, the greater the thrust obtained from each ion. Correspondingly, tungsten is most seriously considered as the ionizer because of its high work function, that is, the energy required for an electron to escape a metal surface is greater than the ionization potential of cesium. Because of this fact, conditions may be made to exist where the cesium will ionize upon contact with the surface of the tungsten.

The performance of the ion engines of the type utilizing porous tungsten as the ionizer is greatly dependent on a high ion current density, which, in turn, is highly dependent on efficient ionization of the propellant as it flows through the ionizer. Theoretical analysis of cesium flow through porous tungsten indicates that efficient ionization requires small pore size, uniform pore distribution, and maximum permeability in the porous tungsten.

In order to obtain acceptable levels of ionization efficiency, the ionizer plate which is made from tungsten must be operated at a temperature of at least about 2000° F. It is, therefore, not only necessary that the said ionizer plate be prepared to initially have a maximum number of pores interconnecting traversing the body, but also that the permeable tungsten allow the flow of the cesium vapors during the operation at 2000° F. or above for prolonged and extensive periods of time.

It has now been discovered that efficiently operating porous tungsten ionizer plates can be made by a method employing ideas and principles which are contrary to the teachings of the prior art. Briefly, the method of the present invention comprises mixing tungsten powder having an average particle size within the range of from about 0.01 micron to about one micron with from 2 to about 10 percent based on the total weight of the composition of a long chain fatty acid, pressing the resultant mixture preferably at a pressure of between 15,000 pounds per square inch and 30,000 pounds per square inch and broadly at a pressure between 10,000 and 50,000 pounds per square inch and sintering the resulting compact for at least 12 hours at a temperature ranging from about 2700° F. to about 3500° F.

It is quite unexpected that sintered tungsten bodies having a high degree of porosity (at least 20 percent) provided by substantially uniformly-sized pores extending entirely through the said body can be made by utilizing such extremely small particles and such relatively low sintering temperatures and extended sintering times. Generally, the porous tungsten bodies have been prepared utilizing particles having an average diameter of at least 5 microns and much higher sintering temperatures (at least 3800° F.) for much shorter periods of time (20 minutes to 2 hours). Moreover, no fillers have been employed.

The porous tungsten bodies prepared in the standard manner of the prior art have particularly been used as cathodes in electronic tubes. These bodies also find utility in the area of highly loaded electrical contacts wherein the sintered tungsten body provides a skeleton which is impregnated with copper and other electrically-conductive metals. In the manufacture of shaped tungsten articles of predetermined dimensions, a porous tungsten compact is prepared by presintering a pressing thereof at relatively low temperatures (as low as 1832° F.) sintering at a higher temperature (about 3800° F.) impregnating with copper and machining to obtain the desired predetermined shape. After the machining process is completed, the body is then heated at a temperature of about 2925° F. in a vacuum whereby the copper completely evaporates from the body. The resulting body had unacceptable flow properties.

In the drawing there is shown photomicrographs of sintered tungsten bodies etched with a mixture of potassium hydroxide and potassium ferrocyanide. The magnification of all the photomicrographs is 750. The samples shown in FIGURES 4 and 5 have been infiltrated with molten copper to facilitate polishing. The copper filling the initial voids appears as grey areas in the figures.

The instant invention is carried out utilizing comminuted tungsten which has been reduced to a particle size having an average diameter within the range of from about 0.01 micron and preferably 0.1 micron to about one micron as measured on a Fisher subseive analyzer. While it is preferred that all of the particles be one micron or less, up to a 0.1 percent of the particles may be about 5 microns or above. This powder is then intimately mixed with a long chain fatty acid, preferably stearic acid. It is preferred that the stearic acid be present in amounts ranging from about 2 to 4 percent by weight of the total composition. However, amounts as high as 10 percent of the stearic acid may be employed.

The long chain fatty acids which have particular utility as filler materials include palmitic, linoleic, linolenic and the like. While other fatty acids may be used as a filler, the long chain fatty acids having at least 16 carbon atoms provide the best results. Other fillers capable of being volatized at temperatures of less than 1000° F. may also be used.

The mixture is then either cold-pressed or hydrostatically pressed at a pressure within the range of from about 10,000 pounds per square inch to about 50,000 pounds per square inch. The compacts are then sintered in a vacuum or an inert or reducing atmosphere, such as hydrogen, at a temperature preferably within the range of from about 2750° F. to about 3000° F. for at least 12 hours. While the optimum results are obtained at temperatures within the above range, temperatures up to 3500° F. may be employed. The method of the instant invention produces tungsten ionizer platelets which provide a high propellant utilization efficiency when employed with an ion engine. The propellant utilization efficiency is the percent ratio of plasma produced to the cesium vapor passed through the ionizer platelet. Efficiencies up to 90 percent have been attained with the platelets produced by the method of the instant invention.

Figure 1:
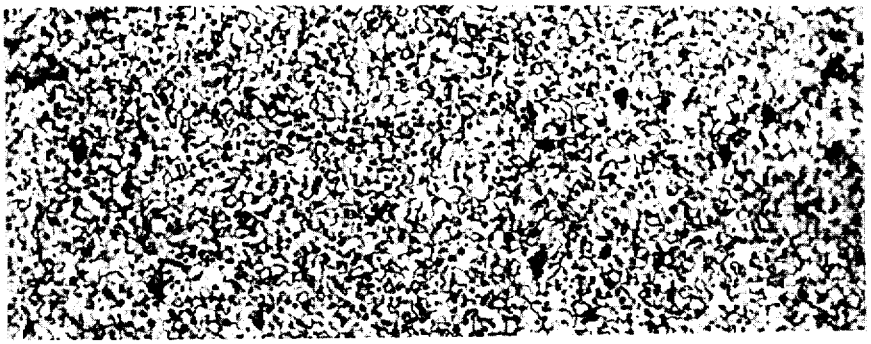
FIGURE 1 is a photomicrograph of the surface of a porous tungsten ionizer platelet prepared in accordance with the methods of the instant invention.

Referring to FIGURE 1 of the drawing, there is shown a photomicrograph of the surface of a porous platelet prepared according to the instant invention. The solid black portions clearly show a substantially uniform distribution of pores at the face and which are easily distinguished from the grain boundaries represented by the curved lines. Moreover, they are shown to be closely situated to one another. The randomly located larger black portions are areas where tungsten particles were pulled from the surface during polishing of the samples.

Figure 2:
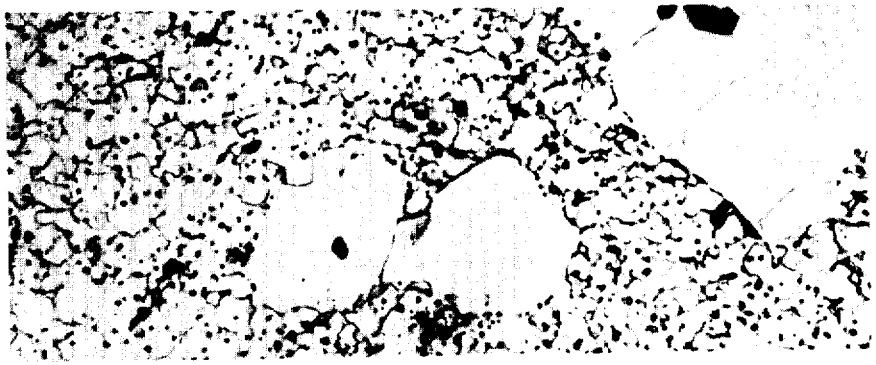
FIGURES 2 and 3 are photomicrographs of the surface of sintered tungsten bodies of the prior art.
Figure 3:
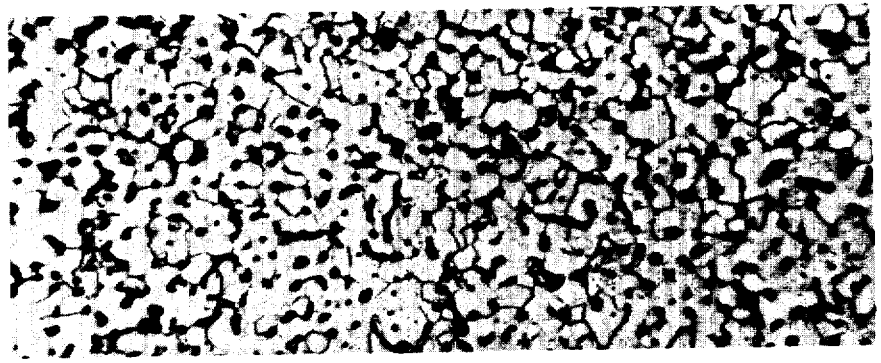

When the surface shown in FIGURE 1 is compared with the prior art samples shown in FIGURES 2 and 3, uniform size and distribution of the pores of the sintered body of the instant invention becomes significant. The body shown in FIGURE 3 was prepared without filler, utilizing particles having an average diameter of at least five microns. From FIGURES 2 and 3, it is readily apparent that the size and distribution of the pores in the samples of the prior art is random and erratic. FIGURE 2 especially shows this to be true by the presence of large non-porous areas. Additionally, the sample shown in FIGURE 2 manifested extremely poor flow characteristics and is considered to be substantially blocked having few pores interconnecting entirely through the body.

The fact that the sintered bodies, as shown in FIGURE 1, can be made to have such good permeability with the process of the instant invention is entirely unexpected.

Figure 4:
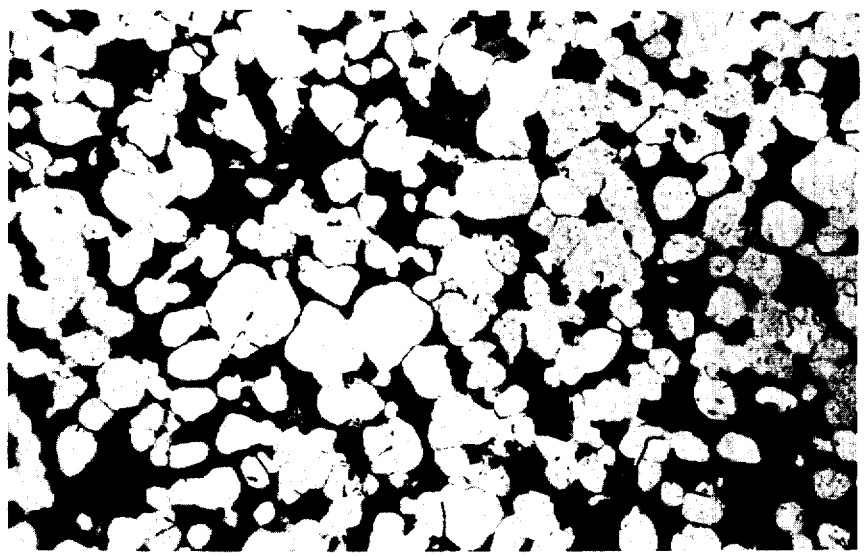
FIGURE 4 is a photomicrograph of a compact prepared using tungsten powder having an average particle size of about 10 microns which has been hydrostatically pressed at 58,000 p.s.i. and sintered for 20 hours at 2900° F.
Figure 5:
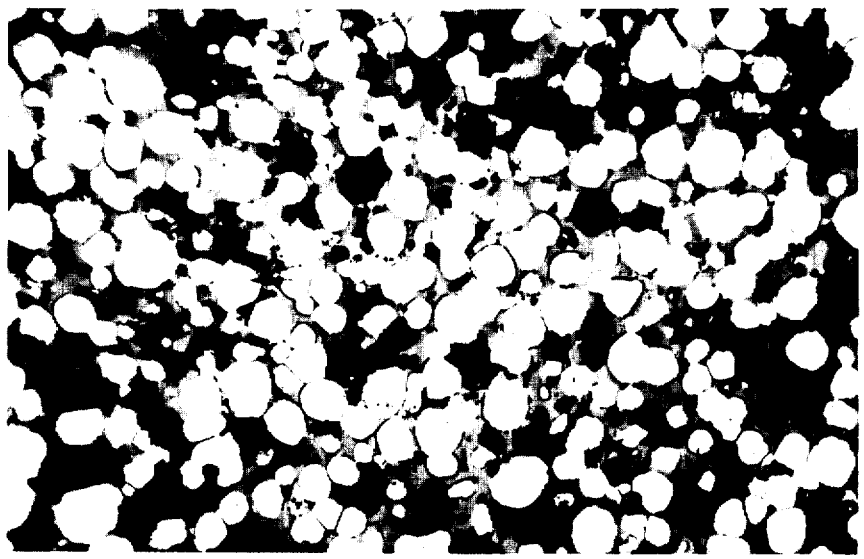
FIGURE 5 is a photomicrograph of a compact prepared from tungsten powder having an average particle size of about one micron which has been hydrostatically pressed at 58,000 pounds per square inch and sintered for 20 hours at 2500° F.

FIGURE 4 shows the surface of a tungsten compact prepared using particles having an average diameter of about 10 microns and wherein the compact was pressed at 58,000 pounds per square inch and sintered at 2900° F. for 20 hours. It is also quite evident from FIGURE 4 that very little, if any, sintering has taken place. As seen in FIGURE 5, very little, if any, sintering takes place at 2500° F. using one micron size particles of tungsten, but that sintering takes place at 2750° F. using one micron size tungsten particles is evident from FIGURE 1. The large grey areas of copper are indicative of void size. If one were to use larger particles similar to those employed by the prior art very little, if any, sintering would be obtained at temperatures within the range employed by applicant.

The permeability of the bodies of the instant invention was tested by measuring the flow of nitrogen through the body. The test sample or specimen is placed between two calibrated volumes of nitrogen to completely separate the volumes from each other. The entire system is initially evacuated to $10^{-5}$ millimeters of mercury. Nitrogen is introduced into one volume to a predetermined pressure level. Flow rates are determined by observation of the pressure rise in the downstream volume and the resultant pressure drop in the upstream volume as a function of time. The combined leak rate and outgasing rate of the system are easily correlated to get the flow rate which, in turn, may be used to determine the permeability of the platelet. A 1.1 inch diameter ionizer platelet prepared by the method of the instant invention manifested a flow rate of about $2 \times 10^{-6}$ standard cubic feet per second at a pressure differential of 100 millimeters of mercury.

The porosity is determined by subtracting the measured density from the theoretical density and dividing by the theoretical density. The sample shown in FIGURE 1 of the drawing has porosity of about 25 percent.

Figure 6:
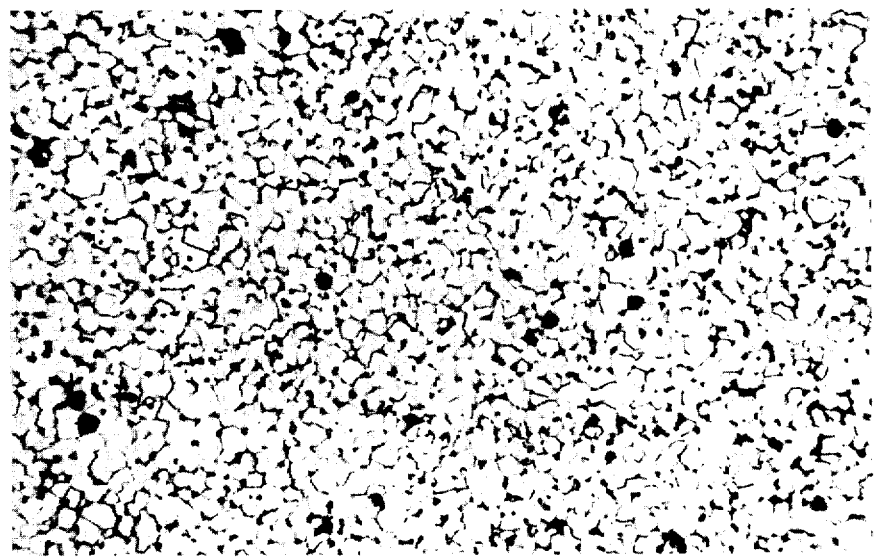
FIGURE 6 is a photomicrograph of the surface of a sintered body prepared from tungsten powder having an average particle size of one micron which has been hydrostatically pressed at 58,000 pounds per square inch and sintered for 20 hours at 2750° F.
Figure 7:
FIGURE 7 is a photomicrograph of the surface of a sintered tungsten body which has been prepared using tungsten powder having an average particle size of one micron which was hydrostatically pressed at 58,000 pounds per square inch and sintered for 20 hours at 2900° F.

FIGURES 6 and 7 are photomicrographs of the surface of a sample prepared using tungsten particles having an average diameter of 1 micron, but which were pressed hydrostatically at 58,000 pounds per square inch and sintered at 2750° F. and 2900° F., respectively, for twenty hours. No stearic acid was employed. When flow tested as above these samples manifested no flow rate above the leak rate of the test system and, therefore, the sample platelets were assumed to have no appreciable interconnecting permeability. The surface, as shown in FIGURES 6 and 7 of these samples, manifests a uniform size and distribution of pores similar to that shown in FIGURE 1; the only difference in preparation being in the pressure used and the lack of filler in the compact.

The following example is given by way of illustration and not by way of limitation. All parts and percentages are by weight unless otherwise specified.

*Example I*

Tungsten particles having an average diameter of about 1 micron, as measured on a Fisher sub-sieve analyzer, were mixed with 2 percent (based on the weight of the entire composition) of stearic acid. The stearic acid was mixed with acetone and blended as a slurry into the tungsten. The acetone was evaporated prior to pressing. The mixture was hand-loaded into a die cavity to a depth of about 0.060 inch. Compacts were cold-pressed at a pressure of about 25,000 pounds per square inch. The thickness of the platelets after pressing was in the order of about 0.020 inch. The pressed platelets were then sintered in a resistant-heated furnace with flowing hydrogen atmosphere. The furnace utilized a 3-inch diameter, 10-inch long alumina tube core circumferentially wrapped with a 0.080 inch diameter molybdenum wire heating element. The core was packed all around with alumina brick insulation which, in turn, was enclosed with a double wall water-cooled steel jacket. After all the furnace ports were closed, the chamber was evacuated to a moderate vacuum with a small mechanical vacuum pump. Hydrogen gas was introduced into the system and when a small positive pressure was reached, an exhaust valve was opened slightly to allow a very small flow of hydrogen which was maintained during the entire sintering cycle. The samples were then heated at a rate of 600° F.–800° F. per hour to 2750° F., held for twenty four hours and cooled at approximately the same rate. The resultant platelets were tested for flow as above and also etched and photographed to produce the picture illustrated by FIGURE 1.

*Example II*

One of the sample platelets was tested for performance in an ion engine. The ionizer platelet of Example 1 was tested in an ion rocket engine similar to that described in an article by David L. Lockwood and Ronald J. Cybulski, entitled "Performance Evaluation of a Two-Dimensional Ion Rocket Engine Using Throughfed and Porous Tungsten Iionizers" (NASA Technical Note D-766), April 1961. The sintered platelets of Example I were 27/32 of an inch by 6¾ inches by 0.02 inch. About 85 percent of cesium vapor produced was ionized during the operation of the engine.

Briefly, the ion engine employing the ionizer platelets of the present invention comprised a vaporizer for the cesium in communication with a distribution chamber which, in turn, terminated at the ionizer platelet. On the other side of the ionizer were beam-forming electrodes to consolidate the resulting cesium ions which were attracted by accelerator electrodes. An electron generator supplied electrons at the outlet to prevent a space charge.

The ionizer platelets of the instant invention are designed according to the current critical temperature relation for non-zero electric fields at the surface of the ionizer. The ideal design, of course, would be a platelet having infinitesimal thickness to obtain maximum ionization efficiency.

The platelet may be impregnated with a filler and machined to size with subsequent evaporation of the filler. Machining is not desirable, however, because many of the minute pores may become sealed by the machining action.

While the embodiments of the present invention, as herein disclosed, constitute preferred forms, it is to be understood that other processes and methods might be adopted, all coming within the scope of the appended claims.

What is claimed:

1. A method comprising mixing tungsten powder having an average particle size within the range of from about 0.01 micron to about one micron, with from 2 percent to about 10 percent based on a total weight of the mixture of a long chain fatty acid, pressing the resulting mixture at a pressure between 10,000 pounds per square inch and 50,000 pounds per square inch and sintering the resulting compact for at least 12 hours at a temperature within the range of from about 2700° F. to about 3500° F. in a substantially non-oxidizing atmosphere.

2. A method of making porous tungsten ionizer platelets comprising mixing tungsten powder having an average particle size within the range of from about 0.1 micron to about one micron with from about 2 percent to about 4 percent stearic acid cold pressing the said mixture at a pressure in the range of from about 15,000 pounds per square inch to about 30,000 pounds per square inch and sintering the resultant compacts at a temperature within the range of from about 2750° F. to about 3000° F. for at least 12 hours in a non-oxidizing atmosphere.

3. A method of making porous tungsten ionizer platelets comprising mixing tungsten powder having an average particle size of about one micron with about 2 percent stearic acid based on the total weight of the mixture, cold pressing the mixture at a pressure of about 25,000 pounds per square inch and sintering the resultant compact at a temperature of about 2750° F. for at least 12 hours in an atmosphere of hydrogen.

4. A uniform flow-through tungsten platelet having pores of uniform size and distribution for use with an ion rocket engine, said porous tungsten platelet prepared by the method of claim 3.

5. A method of making porous tungsten platelets comprising mixing tungsten power having an average particle size of about one micron with a slurry of stearic acid and acetone, evaporating the acetone to obtain a resultant mixture, said resultant mixture comprising 2 percent stearic acid based on the total weight of the resultant mixture, cold pressing said resultant mixture at a pressure of 25,000 pounds per square inch, heating the resulting compact at a maximum rate of 600° to 800° F. per hour until the resultant compact reaches a temperature of about 2750° F. and then sintering the resultant compact for 20 hours at this temperature.

References Cited in the file of this patent

UNITED STATES PATENTS

| 2,386,544 | Crowley | Oct. 9, 1945 |

FOREIGN PATENTS

| 494,956 | Great Britain | Nov. 3, 1938 |
| 707,512 | Great Britain | Apr. 21, 1954 |